(12) United States Patent
Park et al.

(10) Patent No.: US 11,087,295 B2
(45) Date of Patent: Aug. 10, 2021

(54) SYSTEM AND METHOD FOR PRIVATE DATA TRANSACTIONS

(71) Applicant: PAYPAL, INC., San Jose, CA (US)

(72) Inventors: Moo Kyo Park, Burnaby (CA); Jagminder Singh Jhand, Surrey (CA); David Koch, Vancouver (CA)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/537,518

(22) Filed: Aug. 9, 2019

(65) Prior Publication Data

US 2021/0042721 A1     Feb. 11, 2021

(51) Int. Cl.
*G06Q 20/00* (2012.01)
*G06Q 20/10* (2012.01)
*G06Q 50/26* (2012.01)

(52) U.S. Cl.
CPC ............. *G06Q 20/10* (2013.01); *G06Q 50/26* (2013.01)

(58) Field of Classification Search
CPC ............................... G06Q 20/10; G06Q 50/26
See application file for complete search history.

(56) References Cited

U.S. PATENT DOCUMENTS

| | | | |
|---|---|---|---|
| 2002/0161707 A1* | 10/2002 | Cole | G06Q 40/00 705/42 |
| 2006/0287953 A1* | 12/2006 | Chauhan | G06Q 20/10 705/39 |
| 2007/0255662 A1* | 11/2007 | Tumminaro | G06Q 20/10 705/79 |
| 2013/0254098 A1* | 9/2013 | Holland | G06Q 40/02 705/39 |
| 2015/0006364 A1* | 1/2015 | Sobhani | G06Q 20/382 705/39 |
| 2016/0132890 A1* | 5/2016 | Banerjee | G06K 9/00885 705/44 |

* cited by examiner

*Primary Examiner* — Mike Anderson
*Assistant Examiner* — Matthew Cobb

(57) ABSTRACT

A system and method for transacting private data is described. A request for a transaction between a payor and a payee is received. A need for additional information for at least one of the payor or the payee is further determined from a payment processing partner. The requested additional information is obtained from one of a database or from the one of the payor or the payee. The obtained requested additional information is sent to the payment processing partner.

18 Claims, 6 Drawing Sheets

SYSTEM AND METHOD FOR PRIVATE DATA TRANSACTIONS

TECHNICAL FIELD

The subject technology generally relates to data privacy and more particularly, relates to a system and method for selectively providing private data to fulfill transaction requirements.

BACKGROUND

In the world of ecommerce, certain amount of private data may be needed from the payor and/or payee in order for a transaction to be consummated. For example, personal identification information (i.e., name, address, social security number, phone number, etc.) as well as financial instrument information (e.g., credit card number, bank account number, etc.) may be required in order to process the transaction. Furthermore, in certain countries like China, government regulators may have a higher level of demands for information. Thus, additional information may need to be gathered in order for a transaction involving a digital wallet in China to be completed.

The passing of sensitive information across multiple channels, however, creates many security issues. Not only can this information be intercepted during transmission between channels, but the more intermediaries that have access to and stores this information, the more opportunities there are for the information to be stolen (i.e., more targets that can be subject to hacking) and misappropriated. As such, the preferred situation is for there to be as few parties that have access to this information as possible, while still providing a platform for the information to be passed on to the appropriate party upon necessity. Accordingly, there needs to be a platform that can transact private data in a manner so as to minimize the exposure of the data to potential hacking.

SUMMARY

According to various aspects of the subject technology, a system for transacting private data is described. A request for a transaction between a payor and a payee is received. A need for additional information for at least one of the payor or the payee is further determined from a payment processing partner. The requested additional information is obtained from one of a database or from the one of the payor or the payee. The obtained requested additional information is sent to the payment processing partner.

According to various aspects of the subject technology, a method for transacting private data is described. A request for a transaction of a monetary amount from a payor to a payee is received. The request includes a payor provided condition for the transaction. A request for supplemental information related to the condition is sent to the payee. The requested supplemental information is received from the payee. A determination is made that that the supplemental information satisfies the condition. The monetary amount is caused to be transacted from the payor to the payee.

According to various aspects of the subject technology, a non-transitory machine-readable medium having stored thereon machine-readable instructions executable for transacting private data is described. A request for a transaction between a payor and a payee is received. A request for certification of at least one of the payor or the payee is further received from a payment processing partner. A determination that the at least one of the payor or payee for which the certification is requested is certified is made based on information available. A certification of the at least one of the payor or payee is sent to the payment processing partner.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Data privacy has become of primary importance over the years. Data such as personally identifiable information (PII), when misappropriated, may lead to much damage to the corresponding owner. Thus, it is imperative that PII be properly handled such that data leaks are minimized. However, as the volume of online transaction continue to grow, so does the amount of private data that gets sent across the internet. Private data that is transacted across many channels and stored on multiple databases make private data particularly vulnerable. Accordingly, protocols such as encryption have been employed to enhance security of this type of data.

Encrypting sensitive information so that only authorized parties with the proper key can view the information does in fact provide an element of security. This solution, however, may create unwanted friction. Parties such as government agencies may find it too burdensome to use encryption because it takes time to encrypt and decrypt files. Thus, encryption may not be a viable option.

In order to serve better serve the needs of payment processors that require private data to carry out transactions, particularly crossborder ones, a system is provided to produce private data on an as-needed basis so that no more information is sent across communication channels than is necessary. The system may disseminate the data in a secure manner, or may simply certify a user who is a party in the transaction for whom additional data is sought. By limiting access to information to only agents that require the information in order for the transaction to be processed, exposure of private data to the outside world may be minimized.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
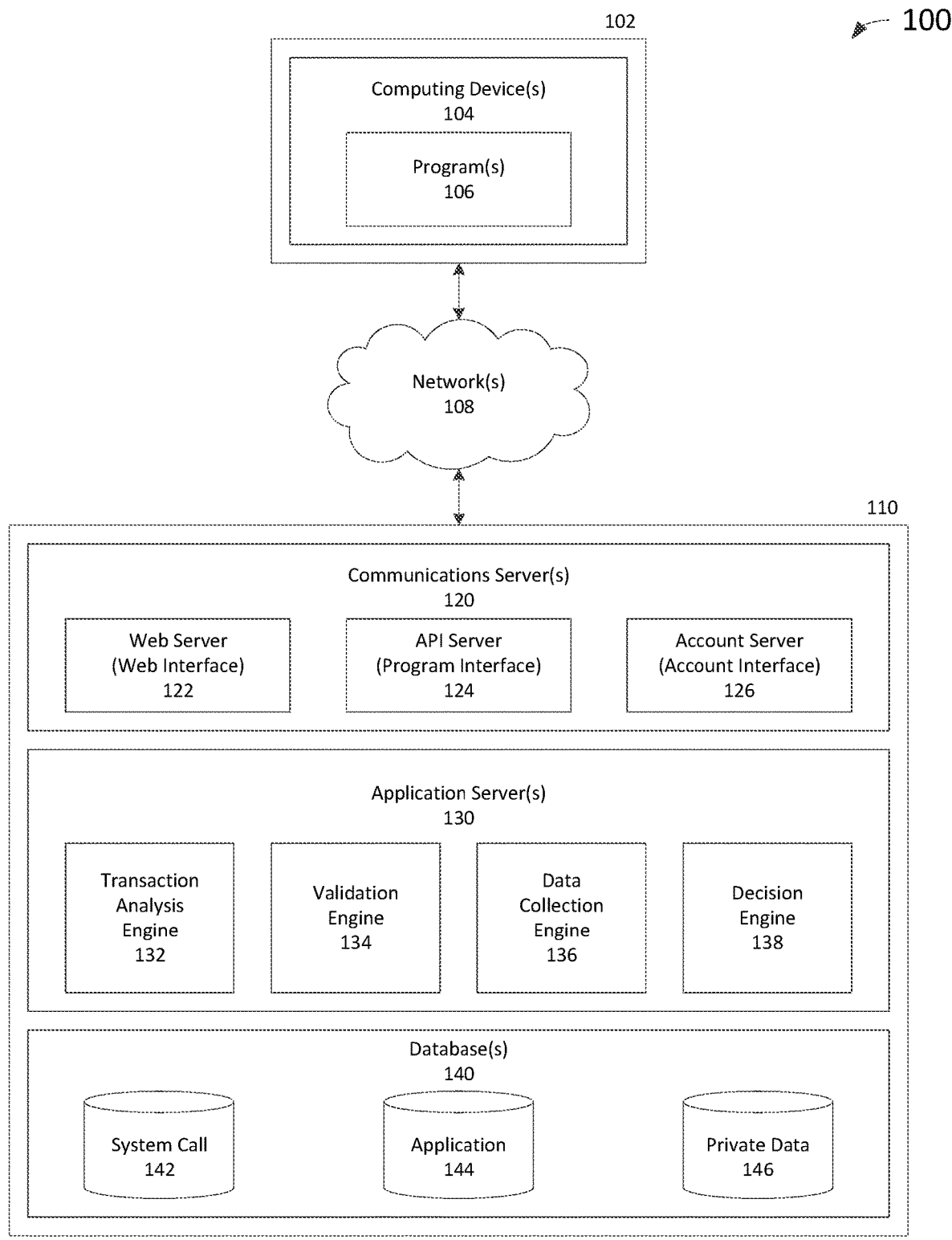
FIG. 1 is a block diagram of an exemplary computing system on which the transaction of private data may be performed.

FIG. 1 is a block diagram of an exemplary computing system on which the transaction of private data may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a account server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services such as tools for verifying URLs based on information collected about customers. Application servers 130 may include multiple servers and/or components. For example, application servers 130 may include a transaction analysis engine 132, validation engine 134, data collection engine 136, and/or decision engine 138. These servers and/or components, which may be in addition to other servers, may be structured and arranged to transact private data.

Application servers 130, in turn, may be coupled to and capable of accessing one or more databases 140 including system call database 142, application database 144, and/or private data database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
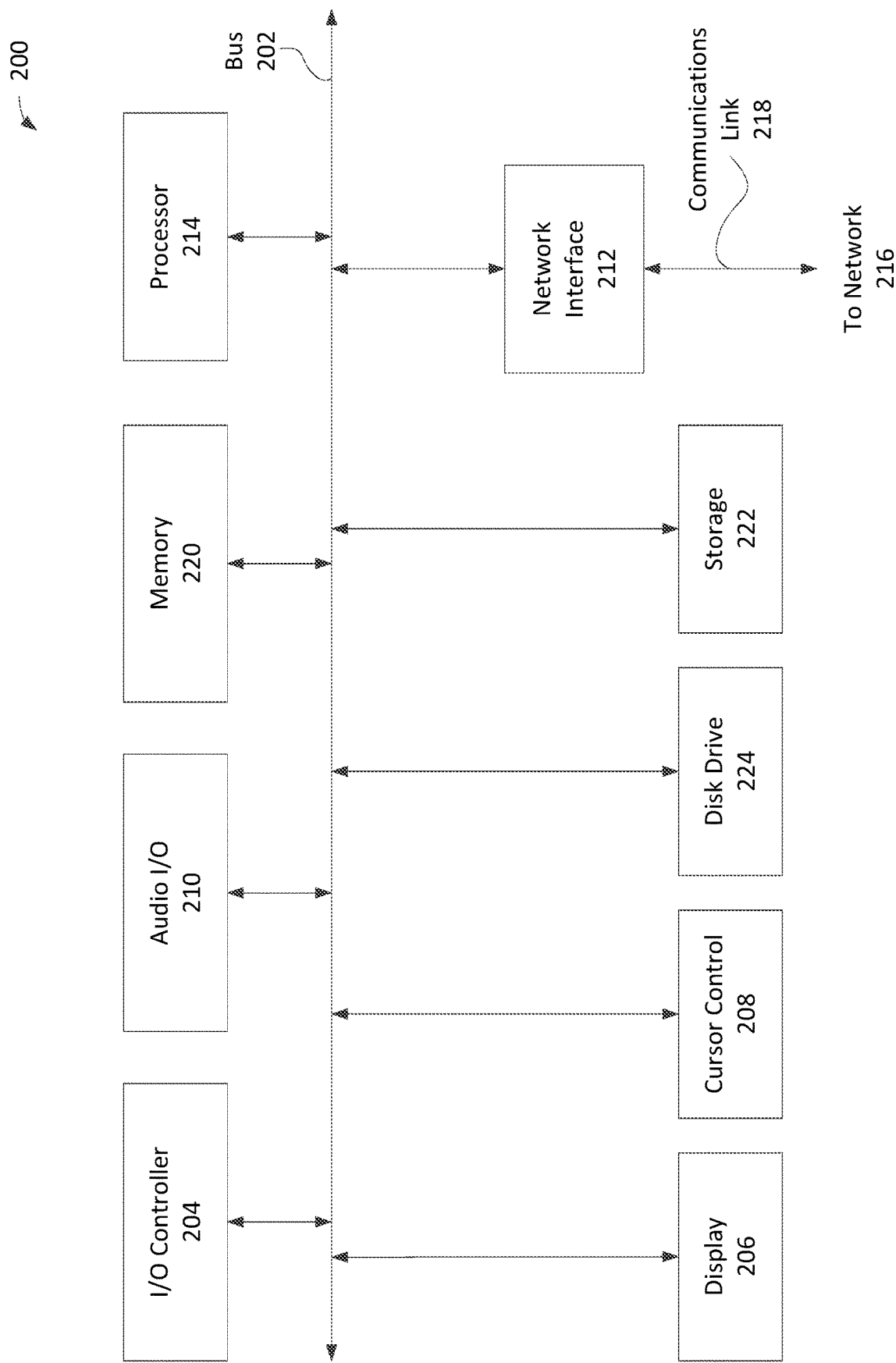
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
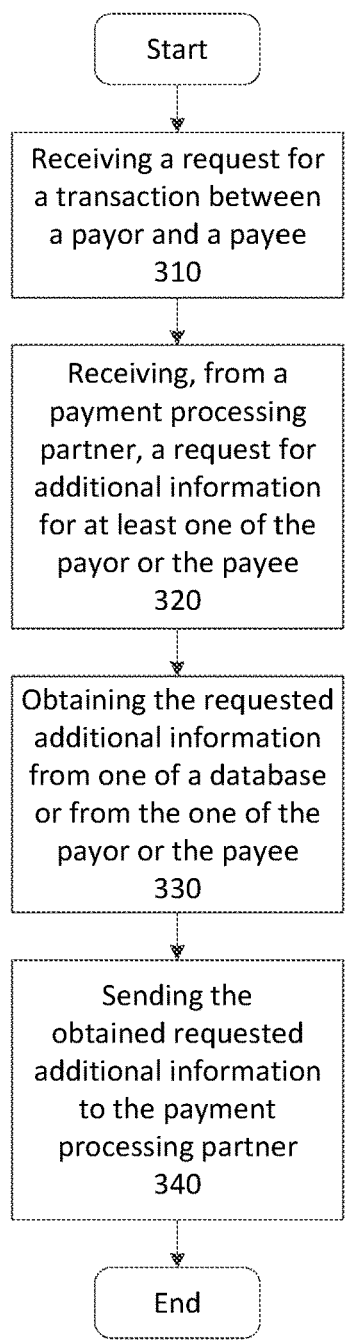
FIG. 3 illustrates an exemplary process 300 for transacting private data.

FIG. 3 illustrates an exemplary process 300 for transacting private data. In step 310, a request for a transaction between a payor and payee is detected by a payment processor. In some instance, a payor may create a payment to a payee. For example, the host of an online marketplace (i.e., the payor) may wish to disburse funds to one or more of the vendors (i.e., the payees) who have sold some goods on the online marketplace. Specifically, the host received a payment from consumers that purchased items from the vendors, and now the wishes to disburse those amounts to the vendors. The request may in some instances may be as simple as an email address and an amount to be paid to that email address.

In step 320, a request for additional information for either the host/payor or vendor/payee, or both, may be received from a payment processing partner. While automated clearing house (ACH) transactions are designed to include certain data elements that satisfy domestic requirements, in some embodiments, the payment requested may involve a cross-border transaction that may require the engagement of a local payment processing partner. LianLian Pay and Geoswift are two example services that handle disbursements in China. Given that China happens to be one country whose government agencies require a comprehensive amount of information in order for these transactions to be completed, payment requests are often met with counter-requests for more information about the payor and/or payee. That is, any required information detected as being absent from the request by the payment processing partner will cause a hold to be placed on the payment until the additional information is provided.

The request for additional information may serve several purposes. For example, the system may need assurances that the payor account is properly funded before it can disburse payments to the payee. Additionally, sanction, anti-money laundering, and anti-terrorism screenings may need to be performed to ensure that the parties sending and/or receiving the money are not part of groups that have been flagged. Also, when payments exceed a certain amount (e.g., $2500), KYC may be triggered by the payment processing partner to confirm the identity of the parties. As such, a request for additional information may be kicked back for action.

In step 330, the additional information may be obtained by the payment processor. This additional information may be part of information that is collected from the payor or payee during onboarding as part of the know your customer (KYC) checks. The information may be saved on and retrieved from a secured database operated by the original processor. If enough information is retrievable from the database, then the payment processor can connect to the payment processing partner so that an electronic validation can be completed. For example, the validation may be performed via an API (assuming that the payment processing partner provides such an API available use) or by transmitting information in files. This validation can be performed in the background without requiring any additional action from the payor and/or payee.

In some instances, the additionally requested information cannot be procured from saved data (i.e., the information was not collected during onboarding). If this occurs, the payor or payee may be pinged for the additional information. In some embodiments, user verification on the payor or payee may be performed once again.

Furthermore, if the requested additional information is determined to be outside of that which is available on the payment processor's database, feedback may be provided to the payment processor so that the additional information may be requested during future onboarding of users. In other words, the collection of data during onboarding may be dynamically configured as a result of these requests. The rationale behind gathering the additional information in the future is so that a superset of data may be maintained. The more required information that's included in the superset, the less frequently the payment processor will need to reach out to payors or payees for additional information.

In some embodiments, the payment processing partner provide a specific format to be used when the additional information is returned. In other words, there is a one-to-one mapping between the payment request from the payor to the additional information requirement.

After the requested additional information has been obtained, it is sent back to the payment processing partner in step 340. And once the payment processing partner is able to satisfy the information requirement (e.g., offering proof to the governmental agency that the payor and payee are legitimate actors), the payment is then processed and the vendor payee notified of the completion of the transaction.

In some embodiments, an application programming interface (API) may be used to check the status of a payment. The API may provide an indication of what failed and what additional info is needed. The indication may be provided in a metadata format that can be ingested by the payment processor. The data provided by the API (e.g., what additional information is missing) can subsequently be used to update the information required of users during onboarding.

In some embodiments, users that are onboarded for different industries may see different sets of required data. The determination, as discussed above, is made at least in part based on feedback from derived from the request for additional information. In other words, if a particular piece of information is determined to be repeatedly requested of users in a particular industry, then that piece of information will become part of the information requested during onboarding for that industry. Since the payment processor may not be privy to the different financial institutions used by the payment processing partner, and the different financial institutions may request different sets of additional information, a superset of required data may be collected to satisfy the many different institutions.

Figure 4:
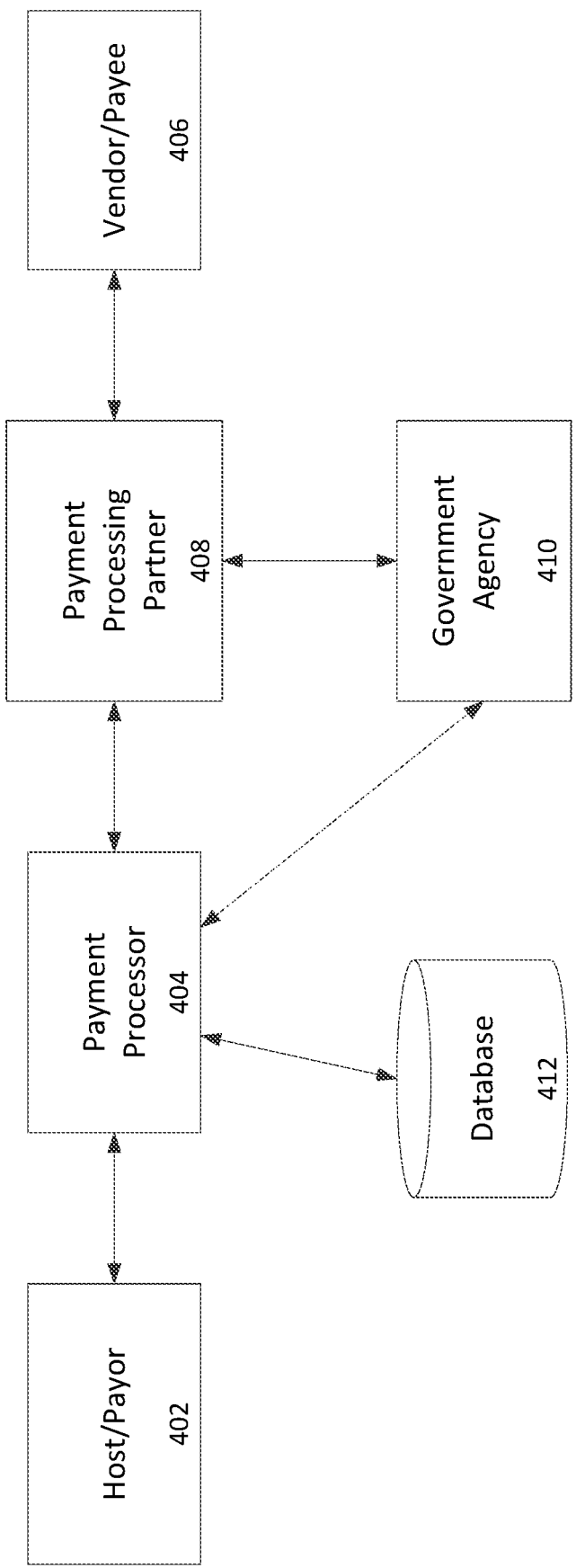
FIG. 4 provides an example graphical depiction of an architecture on which the transaction of private data may be performed.

FIG. 4 provides an example graphical depiction of an architecture on which the transaction of private data described above may be performed. The host/payor 402 is connected directly to the payment processor 404. The host/payor 402, for example, may operate an online market place on which multiple vendors may sell goods and/or services to consumers. The payment processor 404, on the other hand, provides the backend infrastructure to process payments for the host/payor 402 as well as the vendor/payee 406. In the example discussed above, the vendor/payee may be in a different (and regulatorily more restrictive) jurisdiction from the host. As such, the disbursements of funds to the vendor/payee 406 must not only be made through a local payment processing partner 408, but the payment request must also satisfy the requirements of the government agency that regulates such payments.

Accordingly, the disbursement of funds from the host/payor 402 to a vendor/payee 406 that is situated in China, for example, must proceed as follows. First, a request that includes certain information about the host/payor 402 and vendor/payee 406 as well as the transaction amount is passed to the payment processor 404. Since the payment processor cannot disburse funds in China, the payment processor 404 enlists a local payment processing partner 408. As described above, LianLian and Geoswift are two outfits that provide payment processing services in China. The local payment processing partner 408 may check the transaction information provided by the payment processor 404 and determine whether sufficient information has been provided. The specific information requirements may be instituted by government agency 410. For example, the government agency 410 may require that the local payment processing partner 408 provide certain private data about the payor or payee before the transaction may be completed.

When local payment processing partner 408 determines that additional information is necessary, it will return a request to payment processor 404. Upon receiving the request, payment processor 404 may first search for the additional information within database 412. If the additional information is found on database 412 (e.g., the information is part of information that is collected from the payor or payee during onboarding as part of KYC checks), payment processor 404 will retrieve the information and pass it back to the local payment processing partner 408 so that the transaction can be completed. Otherwise, payment processor 404 may ping the host/payor 402 and/or the vendor/payee 406 for the additional information. Upon receipt, local payment processing partner 408 verifies the information and proceeds with completing the transaction.

In some embodiments, the payment information may include a wallet address that provides an indication of where the payment is being sent. Thus, if the payment processor 404 identifies that the payment is going to China, combined with additional parameters of country or currency, then the payment processor will provide the information it believes is required for the local payment processing partner 408 to complete the transaction. In some instances, additional information may be required, and payment is held up until those requirements are met.

Figure 5:
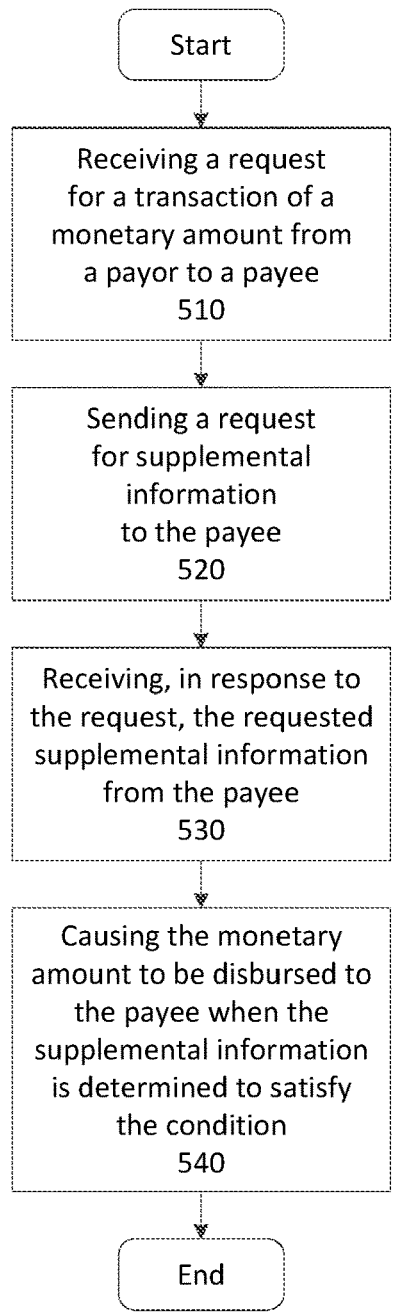
FIG. 5 illustrates an exemplary process 500 for executing transactions based on conditions.

FIG. 5 illustrates an exemplary process 500 for executing transactions based on conditions. In this example, payment is not held up for regulatory reasons, but instead may be held up for contractual reasons. In step 510, a request for a transaction of a monetary amount from a payor to a payee is received. This request may further include a payor provided condition for the transaction. For example, if a payor wishes to donate money to a charity, but will only do so if the charity qualifies as a 501(c)(3), then the payor may send a conditioned request for transfer of a monetary amount.

In this example, the requested supplemental information sought is that which would provide confirmation whether the payee/charity qualifies as a 501(c)(3). The payment is held in abeyance until the payee/charity can prove its status. If the payment processor has such information in its database (e.g., if the payee was confirmed to be a 501(c)(3) at the time of onboarding), then the payment processor will proceed with the transfer of funds. If, however, there's no indication in the database that the payee is a qualified 501(c)(3) organization, then a request for supplemental information is sent to the payee in step 520.

The requested supplemental information is received from the payee in response to the request in step 530. This supplemental information may require validation. In some instances, forms may be scanned and sent into the payment processor for manual review. In other embodiments, electronic verification may be available. If the supplemental information is determined to satisfy the condition in step 540, then the monetary amount is caused to be disbursed from the payor to the payee. If the payee is unable to provide supplemental information that satisfies the condition within a predetermined period of time, then the monetary amount is returned to the payor.

Another example of using the method described in FIG. 5 is for the disbursement of scholarships and financial aid. In this example, an institution may require that a student maintain a minimum grade point average (GPA) in order to continue to receive financial aid. As such, each time financial aid is to be disbursed, the institution may send a request for payment conditioned upon the student's record indicates that he has achieved a satisfactorily high GPA. This request may receive a response of either a "yes" or "no." Only if a response of "yes" is received will the institution disburse those funds.

In an alternative embodiment, an ecosystem for providing KYC as a service may be implemented. As described above, information that is being requested may be sensitive, and thus implicates data privacy. That is, certain platforms may request additional information, but such information may be considered personally identifiable information (PII) and thus protected by law. The transmission of such information becomes a bigger issue when the information is being passed across multiple parties. For example, if the Chinese government requires certain private information, such information must be passed from the payor and/or payee to the payment processor, and then from the payment processor to the local payment processing partner. That information is then passed from the local payment processing partner to the government agency. There may be, in some instances, additional intermediaries.

One way to protect the private information that's to be passed across channels is to not pass that information to begin with. There is no reason for any of the intermediaries to see this information if it's ultimately required only by the government agency. In fact, to minimize the damage that may result from a data breach, the intermediaries may not even want to see/handle this information. As such, it may be helpful to centralize this information to be provided to the appropriate party on an as needed basis, and only at the time when it's necessary.

Figure 6:
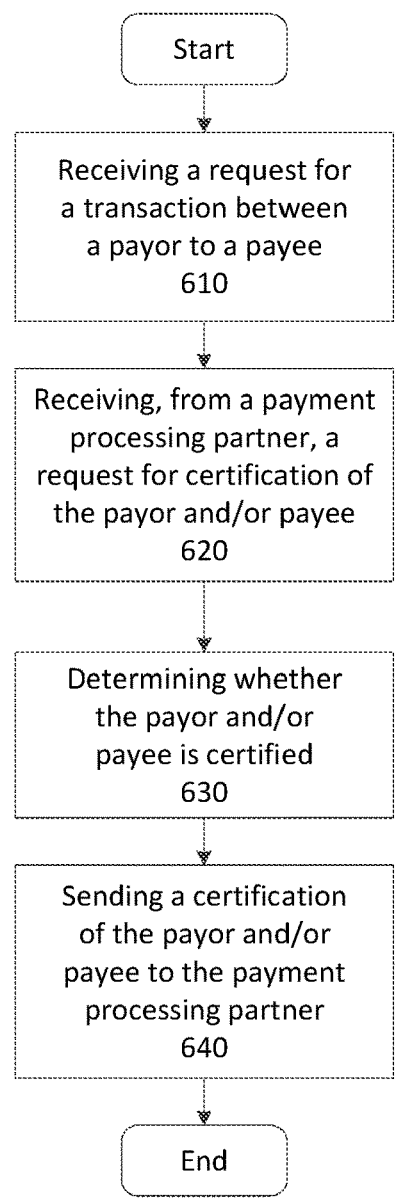
FIG. 6 illustrates an exemplary process 600 for providing KYC as a service using centralized private data.

FIG. 6 illustrates an exemplary process 600 for providing KYC as a service using centralized private data. In step 610, a request for a transaction between a payor and a payee is received by a payment processor. In the example provided above, the host of an online marketplace (i.e., the payor) may wish to disburse funds to one or more of the vendors (i.e., the payees) who have sold some goods on the online marketplace. In cross-border transactions, engagement of a payment processing partner may be required as some countries have strict regulations as to who may or may not conduct business.

In step 620, a request for certification of the host/payor or vendor/payee, or both, may be received from the payment processing partner. This request may stem from a government agency requirement. That is, the payment processing partner in the foreign jurisdiction (e.g., China) may be required to certify that the payor and/or payee. In step 630, the payment processor determines whether the payor and/or payee is certified. This determination may be based on information that's available on a database controlled by the payment processor. If the information is not available, the payment processor may request that the payor and/or payee to provide the documentation necessary for the payment processor to certify the payor and/or payee. Once certified, the payment processor sends a certification of the payor and/or payee back to the payment processing partner in step 640.

In some embodiments, the identity of the user for which additional information is sought may be concealed by hashing the name and/or a unique identification number (e.g., social security number), and sending that hashed value to the payment processor. The payment processor may then find the associated user by looking up the hashed value in a hash table. Once the user is found, the payment processor may return a certification (assuming the user is certified) to the requesting party.

In some embodiments, a certification may not be sufficient to satisfy regulatory requirements, and an actual piece of private data may be required. At that time, the payment processor, who maintains the auditable information, may be requested to provide the required piece of private data to the requesting party. For example, the government agency may contact the payment provide directly so as not to expose the private data across any additional communication channels unnecessarily. As indicated above, a hash of some identity of the user may be sent to the payment processor. Private data may then be returned to the requesting party (e.g., the government agency).

In some instances, the private data may be returned unobfuscated along with the hashed value. For example, private data like date of birth is not unique as many individuals may have the same data of birth. It is only when a data of birth and a name are combined that the information becomes abusable if it falls into the wrong hands. However, since the user's identity is hashed, and there is no way for a bad actor who intercepts the hashed value to translate it into a name, then having a data of birth is no more useful to the bad actor than picking any arbitrary date. In the event the data that the requested private data can be singularly misappropriated, then that data could be encrypted and sent over to the requesting agency.

As indicated previously, government agencies and the like are disinclined to perform decryption; however, if the bulk of KYC can be established with a simple certification by the payment processor, these more specific information requests are one-offs that may not cause as much a disruption to the regular flow if decryption is required. In other words, the infrequency of these events will not create an undue burden on the requesting party if decryption is involved.

In some embodiment, a user's account with the payment processor may be linked to the payment request. As such, any party that wishes to certify the user may do so directly with the payment processor. As described above, the payment processor may be called on to certify the user and, in certain instances, to provide private data on the user.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A payment processor system, comprising:
   a non-transitory memory storing instructions; and
   one or more hardware processors coupled to the non-transitory memory and configured to read the instructions from the non-transitory memory to cause the payment processor system to perform operations comprising:
   receiving, from a first entity located in a first country, a transaction request to perform a cross-border transaction between the first entity and a second entity that is located in a second country;
   sending transaction information, for the cross-border transaction, to a payment processing partner that is associated with the second country;
   receiving, from the payment processing partner, a certification request to certify at least one of the first and second entities;
   determining, based on information maintained by the payment processor system, that the at least one of the first and second entities is certified;
   sending, to the payment processing partner, a certification of the at least one of the first and second entities;
   subsequent to the sending the certification to the payment processing partner, receiving, by the payment processor system from a government agency of the second country, an information request for personal information corresponding to the first entity, wherein the information request indicates the first entity using an obfuscated version of an identifier for the first entity;
   sending, by the payment processor system to the government agency, the personal information corresponding to the first entity, wherein the personal information includes:
   a first item of personal information associated with the first entity; and
   a second, encrypted item of personal information associated with the first entity; and
   causing funds corresponding to the cross-border transaction to be disbursed to the second entity via the payment processing partner.

2. The payment processor system of claim 1, wherein the transaction request for the cross-border transaction includes at least an identifier of the second entity and a monetary amount.

3. The payment processor system of claim 1, wherein the information request is received in response to a determination, by the government agency, that the certification is not sufficient to satisfy regulatory requirements of the government agency.

4. The payment processor system of claim 3, wherein the information request is provided to fulfill at least one of a sanction screening, an anti-money laundering screening, and an antiterrorism screening.

5. The payment processor system of claim 3, wherein the information request is provided to fulfill a know your customer (KYC) process.

6. The payment processor system of claim 5, wherein the KYC process is triggered in response to a determination that a monetary amount of the cross-border transaction exceeds a predetermined amount.

7. The payment processor system of claim 1, wherein the operations further comprise:
   subsequent to providing the personal information to the government agency, updating a configuration of an onboarding process to include a category of the personal information.

8. A method, comprising:
   receiving, by a payment processor from a first entity located in a first country, a transaction request to perform a cross-border transaction between the first entity and a second entity that is located in a second country;
   sending, to a payment processing partner that is associated with the second country, transaction information for the cross-border transaction;
   receiving, from the payment processing partner, a certification request to certify at least one of the first and second entities;
   determining, based on information that is maintained by the payment processor, that the at least one of the first and second entities is certified;
   sending, by the payment processor to the payment processing partner, a certification of the at least one of the first and second entities;
   subsequent to the sending the certification to the payment processing partner, receiving, by the payment processor from a government agency of the second country, an information request for personal information corresponding to the first entity, wherein the information request indicates the first entity using an obfuscated version of an identifier for the first entity;
   sending, by the payment processor to the government agency, the personal information corresponding to the first entity, wherein the personal information includes:
   a first item of personal information associated with the first entity; and
   a second, encrypted item of personal information associated with the first entity; and
   causing, by the payment processor, funds corresponding to the cross-border transaction to be disbursed to the second entity via the payment processing partner.

9. The method of claim 8, wherein the first entity is an organization, and wherein the certification verifies a non-profit status of the organization.

10. The method of claim 8, wherein the second, encrypted item of personal information corresponds to an item of personally identifiable information of the first entity.

11. The method of claim 10, wherein the item of personally identifiable information is a name of the first entity.

12. The method of claim 8, wherein the obfuscated version of the identifier for the first entity is a hash value generated based on the identifier.

13. The method of claim 12, further comprising:
based on the hash value, determining, by the payment processor, an identity of the first entity using a hash lookup table.

14. A non-transitory machine-readable medium having stored thereon machine-readable instructions executable by a payment processor system to cause performance of operations comprising:
receiving, from a first entity located in a first country, a transaction request to perform a cross-border transaction between the first entity and a second entity that is located in a second country;
sending transaction information, for the cross-border transaction, to a payment processing partner that is associated with the second country;
receiving, from the payment processing partner, a certification request to certify at least one of the first and second entities;
determining, based on information maintained by the payment processor system, that the at least one of the first and second entities is certified;
sending, to the payment processing partner, a certification of the at least one of the first and second entities;
subsequent to the sending the certification to the payment processing partner, receiving, by the payment processor system from a government agency of the second country, an information request for personal information corresponding to the first entity, wherein the information request indicates the first entity using an obfuscated version of an identifier for the first entity;
sending, by the payment processor system to the government agency, the personal information corresponding to the first entity to the government agency, wherein the personal information includes:
a first item of personal information associated with the first entity; and
a second, encrypted item of personal information associated with the first entity; and
causing funds corresponding to the cross-border transaction to be disbursed to the second entity via the payment processing partner.

15. The non-transitory machine-readable medium of claim 14, wherein the determining that the at least one of the first and second entities is certified is further based on obtaining information from the at least one of the first and second entity.

16. The non-transitory machine-readable medium of claim 14, wherein the obfuscated version of the identifier for the first entity is provided as a hash of a piece of personally identifiable information of the first entity.

17. The non-transitory machine-readable medium of claim 16, wherein the hash is matched to a database of hashes to identify the first entity.

18. The non-transitory machine-readable medium of claim 14, wherein the second, encrypted item of personal information corresponds to an item of personally identifiable information of the first entity.

* * * * *